No. 837,633. PATENTED DEC. 4, 1906.
J. A. McANULTY.
STAMPING MACHINE.
APPLICATION FILED DEC. 14, 1905.

3 SHEETS—SHEET 1.

Witnesses:
E. A. Panabaker.
J. M. Wynkoop.

Inventor:
John Armstrong McAnulty
By Knight Bros
Attys.

No. 837,633. PATENTED DEC. 4, 1906.
J. A. McANULTY.
STAMPING MACHINE.
APPLICATION FILED DEC. 14, 1905.

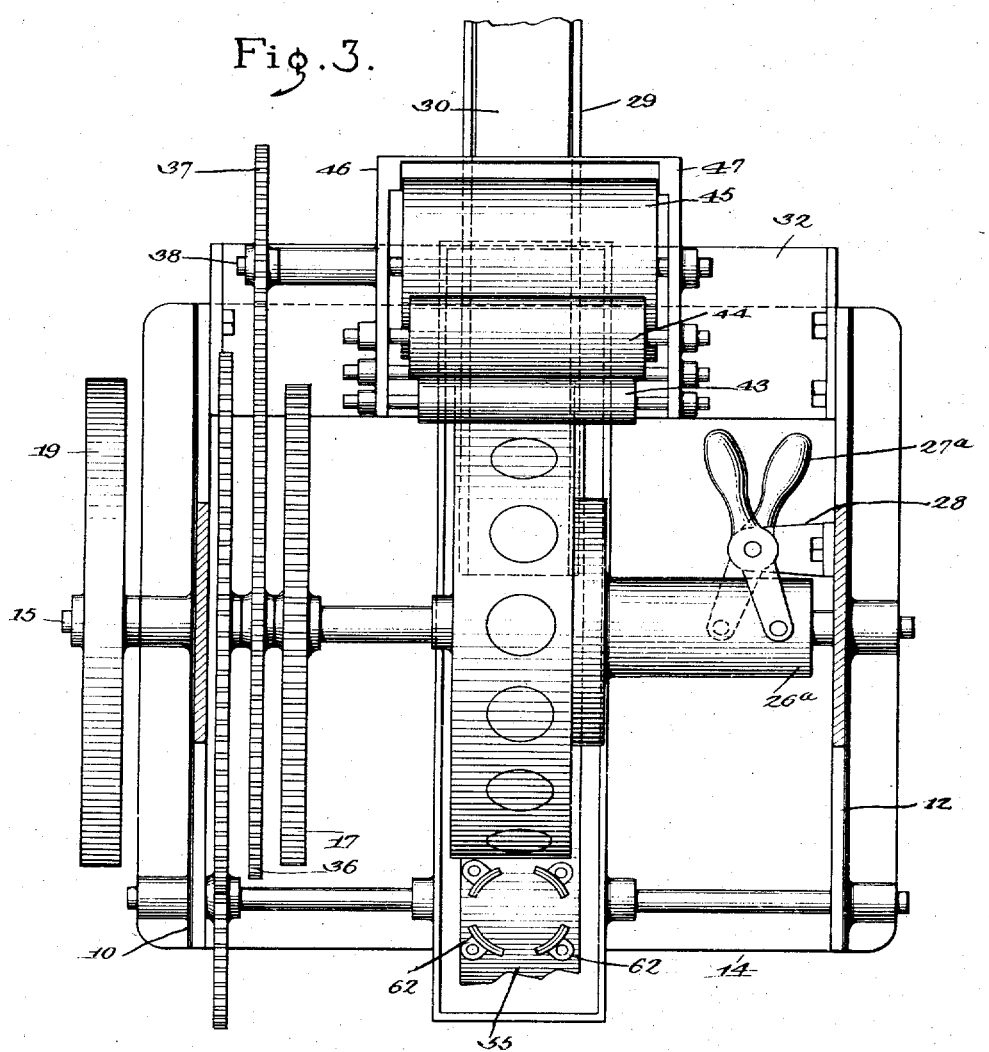

UNITED STATES PATENT OFFICE.

JOHN A. McANULTY, OF BALTIMORE, MARYLAND, ASSIGNOR, BY DIRECT AND MESNE ASSIGNMENTS, TO THE SANITARY STOPPER COMPANY, OF BALTIMORE, MARYLAND.

STAMPING-MACHINE.

No. 837,633.  Specification of Letters Patent.  Patented Dec. 4, 1906.

Application filed December 14, 1905. Serial No. 291,915.

*To all whom it may concern:*

Be it known that I, JOHN ARMSTRONG MCANULTY, a citizen of the United States, residing at Baltimore, in the State of Maryland, have invented certain new and useful Improvements in Stamping-Machines, of which the following is a specification.

My invention relates to improvements in stamping-machines; and the objects are to provide means for stamping or cutting round, square, or irregular shapes, for printing one or both sides either separately from the cutting operation or in unison with the cutting, and for coating the product with liquid material all at one operation. These objects I attain by use of the invention herein described, and illustrated by the accompanying drawings, in which—

Figure 1:
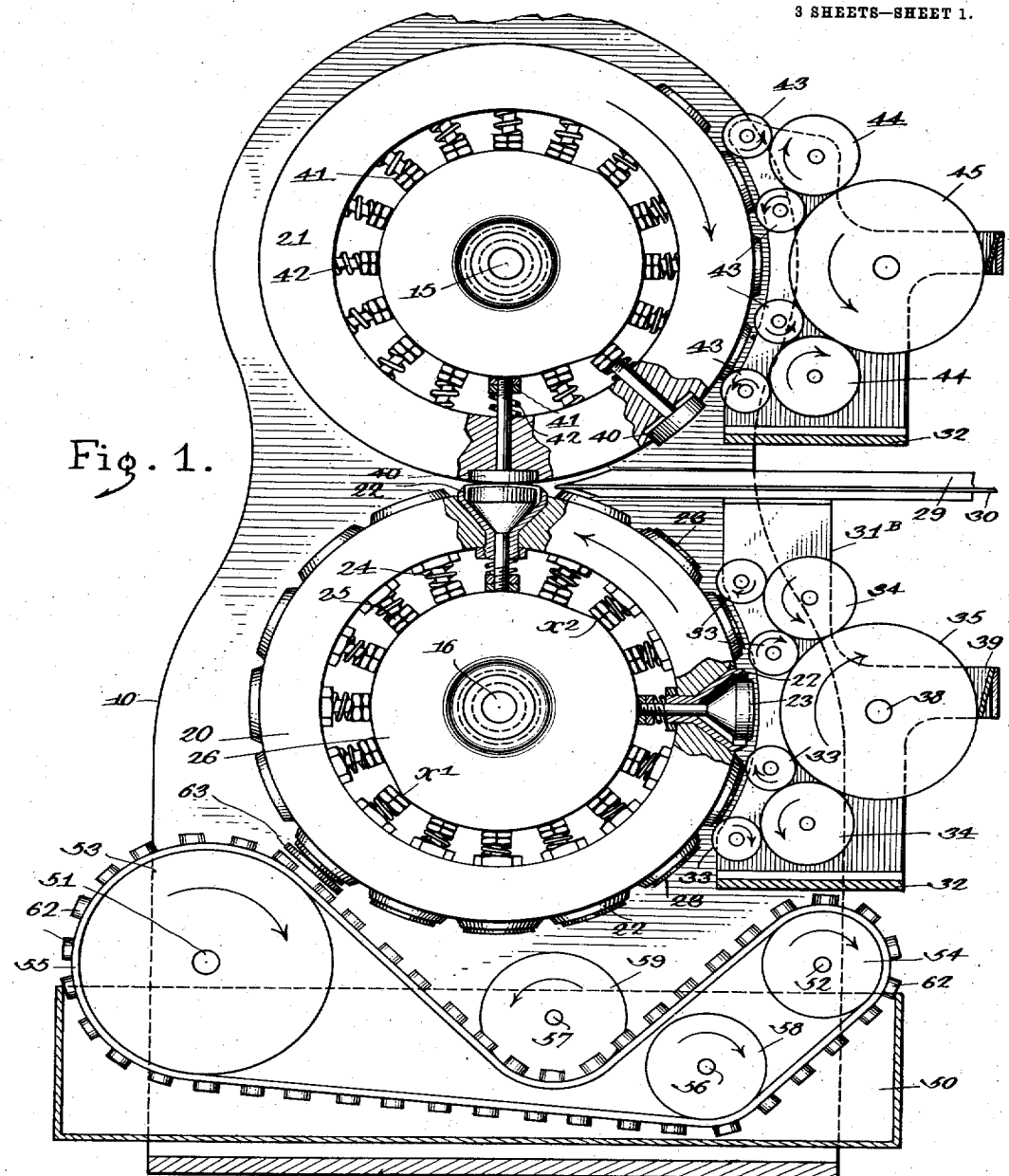
Figure 2:
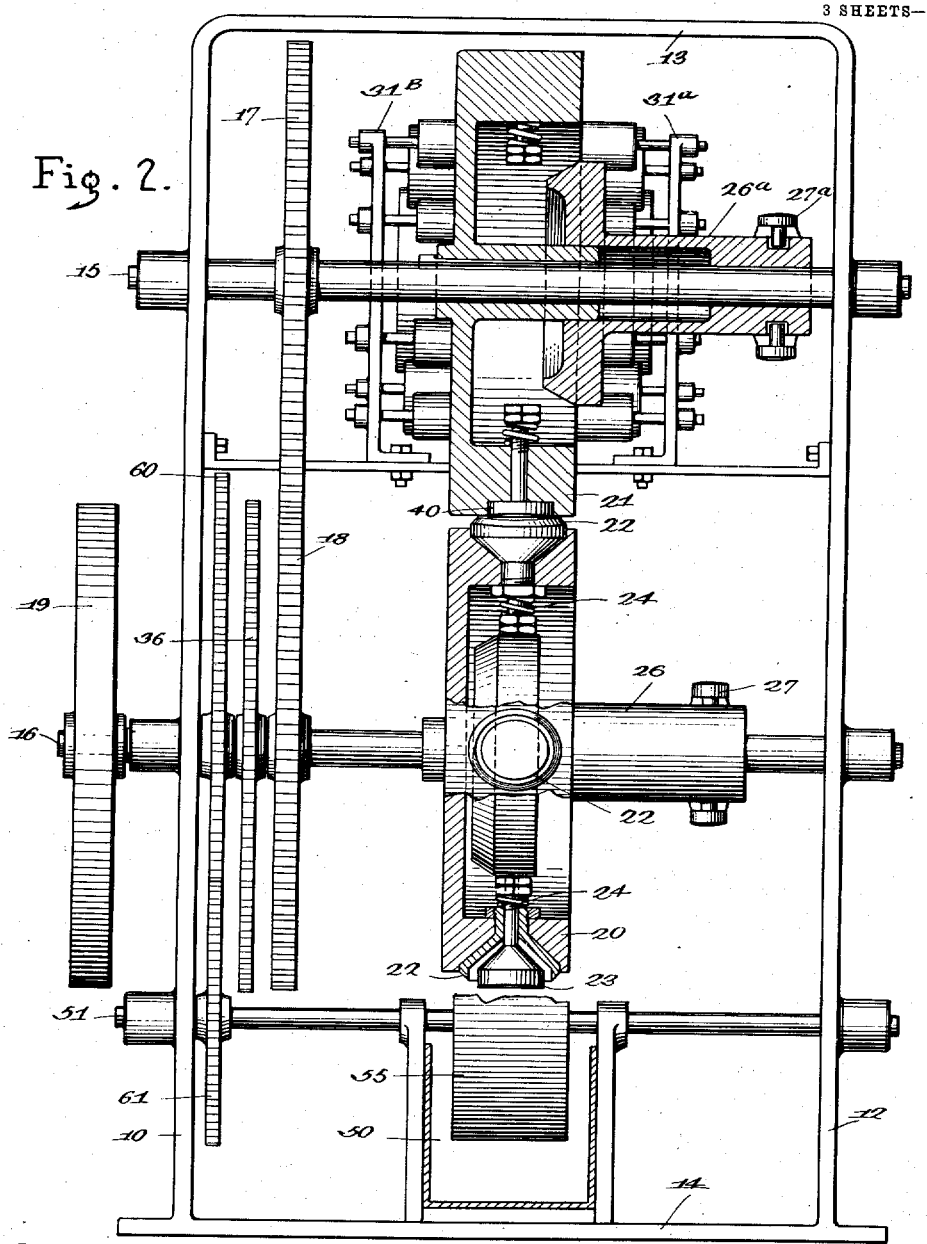

Figure 1 is a side elevation in part sectional and with one side frame removed. Fig. 2 is a front sectional view of my invention with one ink-fountain removed. Fig. 3 is a top view with the upper cross-tie of the framework removed.

10 and 12 are vertical side frame parts. 13 and 14 are horizontal top and bottom tie-plates connecting the side parts. 15 and 16 are horizontal through-shafts journaled in the side parts one above the other and connected by gear-wheels 17 and 18, which serve to maintain their revolutions in unison. A drive-wheel 19 may be mounted on either end of either shaft for power connection with a motor-engine or other means of propulsion. A flanged cylinder 20 is mounted on the shaft 16, in the outer circumference of which are formed receptacles for hollow cutting-dies 22, the cutting edges of which are made to conform to the shapes required to be made. The stems of the cutters extend inward through the shell of the cylinder and are hollow and formed to receive strippers 23, the stems of which extend inward through the stems of the cutters and are provided with compression-springs 24 and jam-nuts 25, which provide adjustment as to length of the stems and friction-surfaces to act against the face of the cam-wheel 26, mounted on the shaft 16, and which is preferably held to transverse and lateral position by means of a lever 27, fulcrumed in proper position by the arm 28, which is attached to the frame-pieces 12. The cam operates to force the strippers outward from $X'$ to $X^2$ when in the position shown on shaft 16 in Fig. 2 and permits the strippers to remain seated when in the position shown on shaft 15.

A cylinder 21, mounted on shaft 15, provides the counter-surface against which the cutting-knives 22 operate. This cylinder may be constructed of a yielding substance in order to permit the proper action of the cutting-knives; but I prefer to make it of substantial material, such as metal, and to insert in it at points corresponding accurately with the positions of the cutting-knives counter-blocks 40, of relatively soft metal, against which the knives cut.

A feed-trough 29, mounted on the frame part 31 and 32, forms a guide to the material being operated upon.

The foregoing-described parts of my invention relate to the handling of materials and are operated as follows: Power being applied to the wheel 19, the two cylinders 20 and 21 are put in motion in the direction indicated by arrows in Fig. 1. The materials to be used are fed through the trough 29 forward between the edges of the hollow cutters 22 and the face of the cylinder 21, which are set to come in contact with each other, cutting through the material. The formed pieces are retained within the cutters and are carried around with them to the position shown at $X'$ in Fig. 1, when they are expelled from the cutters by means of the strippers 23, being forced outward by their contact with the expanded portion of the face of the cam 26.

Where the articles being manufactured are required to be printed or stamped on one side only, the type or engravings are formed in the faces of the strippers 23, which transmit their impressions onto the materials being operated upon as they pass the contact-point with the counter-cylinder 21, as shown in Fig. 1.

In printing the ink is applied to the type by means of a fountain consisting of inking-rollers 33, 34, and 35, mounted on vertical frame-pieces $31^A$ and $31^B$, attached to the horizontal bar 32 in such a manner as to hold the rollers 33 in contact with the projected faces of the strippers 23, while they protrude beyond the faces of the cutters 22, as shown in the lower part of Figs. 1 and 2.

Movement is imparted to the inking-rollers 35 through the gear connections 36 and 37 with the shafts 38 and 15. The ink is supplied from the receptacle formed by the frame side pieces 31^A and 31^B, the face of the roller 35, and the spring-gate 39, the latter being affixed to the frame connection and provided with set-screws for limiting its adjustment relative to the face of the roller 35. From this receptacle the ink is distributed to the roller-faces by contact with the rollers 33, 34, and 35.

If the article to be manufactured is required to be printed or embossed on both sides, type or engravings may also be formed in the faces of the counter-blocks 40, set in the cylinder 21, as shown in the upper parts of Figs. 1, 2, and 3, where the stems are shown projecting inward through the cylinder and are provided with jam-nuts 41, which form friction-surfaces to act against the cam 26 and to cause the extension of the counter-blocks 40 outward for the purpose of receiving ink. The nuts also act against one end of compression-springs 42, which are mounted on the stems of the counter-blocks 40 between the lock-nuts and the inner wall of the cylinder. The action of the springs returns the counter-blocks to their seated position in the body of the cylinder in printing position after having received ink from the rollers 43, which are mounted in conjunction with the cylinder 21 in the same manner as the before-described ink-well is mounted and operated in conjunction with the cylinder 20.

In the manufacture of products requiring to be lacquered or coated with any liquid material a bath 50 is arranged under the cylinder 20, to which are journaled shafts 51 and 52, upon which are mounted wheels 53 and 54, around which traverse an endless belt 55. Within the walls of the bath are also journaled shafts 56 and 57, upon which are mounted wheels 58 and 59, under which the belt 55 passes and to which motion is imparted from the cylinder-shaft 16, carrying the gear-wheel 60, to the shaft 51 through the gear-wheel 61.

The belt 55 is provided with projections 62, forming pockets in the surface of the belt. The belt is adapted to travel with the exact velocity of speed as that of the peripheral speed of the cutters 22 in the cylinder 20. During their travel the cutters 22 register with the passing pockets in the belt so perfectly that each of the articles 63 being discharged from the hollow cutters is received in one of the traveling pockets in the belt 55 and is carried by the belt down into the bath around the wheel 59. After traversing the liquid substance constituting the bath the article is discharged over the rear end of the bath.

Having thus fully described my invention, what I claim as new, and desire to secure by Letters Patent, is—

1. In a machine for cutting shapes from sheet material, a pair of coöperating rotary members, one of which is provided with a knife-edge cutter presented outwardly at its periphery, and the other of which is provided with a counter-block located to coincide with the cutter as the members rotate and to coöperate therewith in the cutting action; said counter-block being provided with a printing-surface, and having means for presenting it beyond the surface of the rotary member during a portion of the rotation whereby it may receive printing-ink.

2. In a machine for cutting shapes from sheet material, a pair of rotary members, one of which is provided with a knife-edge cutter conforming in outline to the article to be produced, and the other of which provides a surface against which the cutter cuts, a yielding printing device carried by one rotary member and having a printing-surface impinging the article, as it is cut, means for inking the printing-surface, and means projecting the printing device into contact with the inking means.

3. A machine for cutting articles from sheet material comprising a pair of rotary members, one of which carries a knife-edge cutter, and the other of which coöperates with said cutter to provide the cutting action; said knife-edge cutter being provided with a stripper located therein, formed with a printing-surface in position to make an impression upon the article produced by the cutter, and moving outwardly after the cutting operation to eject the article and to present its printing-surface in position to receive ink.

4. The combination of the rotary member carrying a knife-edge cutting-die with a stripper located within the same, and movable radially outward, a cam between which and the rotary member, there is relative rotation in the operation of the machine, engaging the stripper to project it outwardly during a portion of the rotation, and means for moving said cam axially out of the plane of the stripper.

5. The combination of the rotary member carrying a knife-edge cutting-die with a stripper located within the same and movable radially outward, a cam between which and the rotary member there is relative rotation in the operation of the machine, engaging the stripper to project it outwardly during a portion of the rotation, said cam being movable axially out of the plane of the stripper, and a lever engaging said cam and adapted to fix its position.

6. In a machine for cutting articles from sheet material of substantially the character described having a radially-movable counter-block, a cam causing projection of the counter-block, movable into and out of the position in which it causes projection of said counter-block.

7. In combination with the inking means and a rotary member having a printing device movable radially into position to receive ink from the inking means, a cam adapted to project the printing device, movable into and out of position to engage the same.

8. In a machine for cutting from sheet material, the combination of the rotary member carrying a knife-edge cutter, suitable means coöperating with said cutter to perform the cutting operation, and a conveyer moving in proximity to the surface of the rotary member and having pockets or receptacles receiving from the cutters, the forms produced thereby.

9. In a machine for cutting articles from sheet material, the combination of a rotary member carrying a knife-edge cutter, means coöperating with said cutter to perform the cutting operation which leaves the article formed within the knife-edge cutter, a stripper located within the cutter, means causing the stripper to eject the article from the cutter at a given point in the rotation, and a conveyer having pockets or receptacles moving at corresponding surface speed with the cutter and presenting its pockets in position to receive each article ejected from the cutter, substantially as described.

10. In a machine for cutting articles from sheet material, the combination of a rotary member having a plurality of knife-edge cutters presented in cutting position in its periphery, means coöperating with said rotary member to cause the knives to cut articles from a sheet fed to the machine, and an endless carrier having pockets or receptacles moved by said carrier into receiving relation with the surface of the rotary member and timed in its travel to cause the pockets or receptacles to coincide with the cutters in the operation of the machine.

11. In a machine for cutting from sheet material, the combination of the rotary member carrying a knife-edge cutter, suitable means coöperating with said cutter to perform the cutting operation, and a conveyer moving in proximity to the surface of the rotary member and having pockets or receptacles receiving from the cutters the forms produced thereby and a bath of coating material through which said conveyer carries the articles which it receives from the cutter.

12. In a machine of the character described, the combination of a rotary member provided with knife-edge cutters which cut and retain articles of desired shape from sheet material, means within said cutters for printing the article thus formed and ejecting it at a given point in the rotation of the rotary member, a conveyer receiving the articles from the cutters, and a bath to which the articles are delivered by said conveyer.

In testimony whereof I affix my signature in presence of two witnesses.

JOHN A. McANULTY.

Witnesses:
CHAS. H. MARTIN,
LILLIAN P. PENINGTON.

---

Correction in Letters Patent No. 837,633.

It is hereby certified that the assignee in Letters Patent No. 837,633, granted December 4, 1906, upon the application of John A. McAnulty, of Baltimore, Maryland, for an improvement in "Stamping-Machines," should have been described and specified as *The Sanitary Stopper Company of Baltimore City*, instead of "The Sanitary Stopper Company, of Baltimore, Maryland;" and that the said Letters Patent should be read with this correction therein that the same may conform to the record of the case in the Patent Office.

Signed and sealed this 1st day of January, A. D., 1907.

[SEAL.]

F. I. ALLEN,
*Commissioner of Patents.* block, a cam causing projection of the counter-block, movable into and out of the position in which it causes projection of said counter-block.

7. In combination with the inking means and a rotary member having a printing device movable radially into position to receive ink from the inking means, a cam adapted to project the printing device, movable into and out of position to engage the same.

8. In a machine for cutting from sheet material, the combination of the rotary member carrying a knife-edge cutter, suitable means coöperating with said cutter to perform the cutting operation, and a conveyer moving in proximity to the surface of the rotary member and having pockets or receptacles receiving from the cutters, the forms produced thereby.

9. In a machine for cutting articles from sheet material, the combination of a rotary member carrying a knife-edge cutter, means coöperating with said cutter to perform the cutting operation which leaves the article formed within the knife-edge cutter, a stripper located within the cutter, means causing the stripper to eject the article from the cutter at a given point in the rotation, and a conveyer having pockets or receptacles moving at corresponding surface speed with the cutter and presenting its pockets in position to receive each article ejected from the cutter, substantially as described.

10. In a machine for cutting articles from sheet material, the combination of a rotary member having a plurality of knife-edge cutters presented in cutting position in its periphery, means coöperating with said rotary member to cause the knives to cut articles from a sheet fed to the machine, and an endless carrier having pockets or receptacles moved by said carrier into receiving relation with the surface of the rotary member and timed in its travel to cause the pockets or receptacles to coincide with the cutters in the operation of the machine.

11. In a machine for cutting from sheet material, the combination of the rotary member carrying a knife-edge cutter, suitable means coöperating with said cutter to perform the cutting operation, and a conveyer moving in proximity to the surface of the rotary member and having pockets or receptacles receiving from the cutters the forms produced thereby and a bath of coating material through which said conveyer carries the articles which it receives from the cutter.

12. In a machine of the character described, the combination of a rotary member provided with knife-edge cutters which cut and retain articles of desired shape from sheet material, means within said cutters for printing the article thus formed and ejecting it at a given point in the rotation of the rotary member, a conveyer receiving the articles from the cutters, and a bath to which the articles are delivered by said conveyer.

In testimony whereof I affix my signature in presence of two witnesses.

JOHN A. McANULTY.

Witnesses:
   CHAS. H. MARTIN,
   LILLIAN P. PENINGTON.

---

Correction in Letters Patent No. 837,633.

It is hereby certified that the assignee in Letters Patent No. 837,633, granted December 4, 1906, upon the application of John A. McAnulty, of Baltimore, Maryland, for an improvement in "Stamping-Machines," should have been described and specified as *The Sanitary Stopper Company of Baltimore City*, instead of "The Sanitary Stopper Company, of Baltimore, Maryland;" and that the said Letters Patent should be read with this correction therein that the same may conform to the record of the case in the Patent Office.

Signed and sealed this 1st day of January, A. D., 1907.

[SEAL.]

F. I. ALLEN,
*Commissioner of Patents.*

Correction in Letters Patent No. 837,633.

It is hereby certified that the assignee in Letters Patent No. 837,633, granted December 4, 1906, upon the application of John A. McAnulty, of Baltimore, Maryland, for an improvement in "Stamping-Machines," should have been described and specified as *The Sanitary Stopper Company of Baltimore City*, instead of "The Sanitary Stopper Company, of Baltimore, Maryland;" and that the said Letters Patent should be read with this correction therein that the same may conform to the record of the case in the Patent Office.

Signed and sealed this 1st day of January, A. D., 1907.

[SEAL.]

F. I. ALLEN,
*Commissioner of Patents.*